United States Patent
Kao

(10) Patent No.: US 6,318,252 B1
(45) Date of Patent: Nov. 20, 2001

(54) JUICER WITH UNIFORM PRESSING

(76) Inventor: I-Feng Kao, No. 200, Shi-Ho Road, West District, Tainan (TW)

( * ) Notice: Subject to any disclaimer, the term of this patent is extended or adjusted under 35 U.S.C. 154(b) by 0 days.

(21) Appl. No.: 09/875,836

(22) Filed: Jun. 6, 2001

(51) Int. Cl.[7] ............................... A23L 1/00; A47J 43/14; B30B 9/06
(52) U.S. Cl. ............................ 100/125; 99/495; 99/508; 99/506; 100/213; 100/283; D7/666
(58) Field of Search ........................... 99/495, 501–508; 100/110, 125, 131–135, 213, 283; D7/665, 666

(56) References Cited

U.S. PATENT DOCUMENTS

| | | | |
|---|---|---|---|
| 385,851 | * 7/1888 | Easley | 99/508 X |
| 2,142,975 | * 1/1939 | Majewski, Jr. | 99/506 X |
| 2,204,964 | * 6/1940 | Koch | 99/506 X |
| 2,220,372 | * 11/1940 | Johnson | 99/508 X |
| 2,588,906 | * 3/1952 | Clark | 100/125 X |
| 2,589,724 | * 3/1952 | Miller | 100/125 |
| 2,591,162 | * 4/1952 | Kircher | 100/125 |
| 2,624,271 | * 1/1953 | Johnson | 100/213 X |
| 2,655,862 | * 10/1953 | Mitnick | 100/125 |

* cited by examiner

*Primary Examiner*—Timothy F. Simone
(74) *Attorney, Agent, or Firm*—Alan Kamrath; Rider, Bennett, Egan & Arundel, LLP

(57) ABSTRACT

A juicer comprises a base, a column extending upward from the base, a vertical rod, a top seat, and a juicing device. The vertical rod has a portion movably mounted in the column and is movable along a vertical direction. The top seat is securely mounted to an upper end of the vertical rod and includes a compartment and an annular recessed portion surrounding the compartment. The juicing device comprises a pressing cup and a reamer. The pressing cup is mounted in the compartment of the top seat and includes a disc having a first side releasably engaged with the top seat and a second side for cooperating with the reamer for extracting juice from a citrus placed on the reamer. The disc has an annular end edge received in the annular recessed portion of the top seat.

6 Claims, 4 Drawing Sheets

JUICER WITH UNIFORM PRESSING

BACKGROUND OF THE INVENTION

1. Field of the Invention

The present invention relates to a juicer with uniform pressing and, more particularly, to a juicer having a pressing cup that provides a uniform pressing during operation.

2. Description of the Related Art

A juicer is generally used to extract juice from citrus. A typical juicer comprises a base for supporting a dripping cup. A column extends upward from the base and a support plate projects from a side of the column and extends in a horizontal plane. A handle has an end with a spindle pivotally received in the column. A gear is mounted to the spindle to rotate therewith. A vertical rack has a portion housed in the column and meshes with the gear. Thus, the vertical rack is moved vertically when the handle is pivoted. A top seat is securely attached to an upper end of the vertical rack to move therewith. A pressing cup includes a threaded upper end for threading engagement with a screw hole in the top seat. A reamer is placed on the support plate. In use, fruit with peel (i.e., citrus) is cut by half and a half of the fruit is placed on top of the reamer and the handle is then pivoted to move the vertical rack downward. The pressure cup is moved downward toward the fruit with peel and thus extracts juice from the fruit. The extracted juice flows into a drip cup placed on the base. The threading engagement between the pressure cup and the top seat is designed to allow easy cleaning of the pressure cup. However, the pressing force acting on the pressing cup concentrates on the threading connection. In addition, the half of the citrus tends to shift laterally during pressing, which results in damage to the threaded portion and loosening of the pressing cup. In addition, the other end of the handle to which the user's palm applies force is in the form of a small rod, which renders a difficult and labor-intensive operation. Further, because the user often washes hands before operating the juicer, the user's wet palm might slip from the handle and thus injure the joint.

SUMMARY OF THE INVENTION

It is an object of the present invention to provide a juicer having a pressing cup that provides a uniform pressing during operation.

It is another object of the present invention to provide a juicer with an easy-to-operate handle for preventing potential injury to the user's hand.

A juicer in accordance with the present invention comprises a base, a column extending upward from the base, a vertical rod, a top seat, and a juicing device for extracting juice from citrus. The vertical rod has a portion movably mounted in the column and is movable along a vertical direction. The top seat is securely mounted to an upper end of the vertical rod to move therewith, the top seat including a compartment and an annular recessed portion surrounding the compartment. The juicing device comprises a pressing cup and a reamer. The reamer is removably mounted on a support plate that extends from a side of the column. The pressing cup is mounted in the compartment of the top seat and includes a disc having a first side releasably engaged with the top seat and a second side for cooperating with the reamer for extracting juice from a citrus placed on the reamer. The disc has an annular end edge that is received in the annular recessed portion of the top seat.

In an embodiment of the invention, a handle has a first end operably connected to the vertical rod and a second end for manual operation, whereby the vertical rod moves vertically when the handle is pivoted. The second end of the handle comprises a flat portion extending laterally therefrom for easy operation.

The top seat comprises an engaging tube with an inner threading. The first side of the disc includes a conic portion having a stub for threading engagement with the inner threading of the engaging tube. The second side of the disc comprises a skirt that includes a conic inner periphery for cooperating with the reamer for extracting juice from a citrus placed on the reamer. The skirt comprises an outer periphery for user's grasp for proceeding with threading engagement between the stub and the engaging tube of the top seat.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
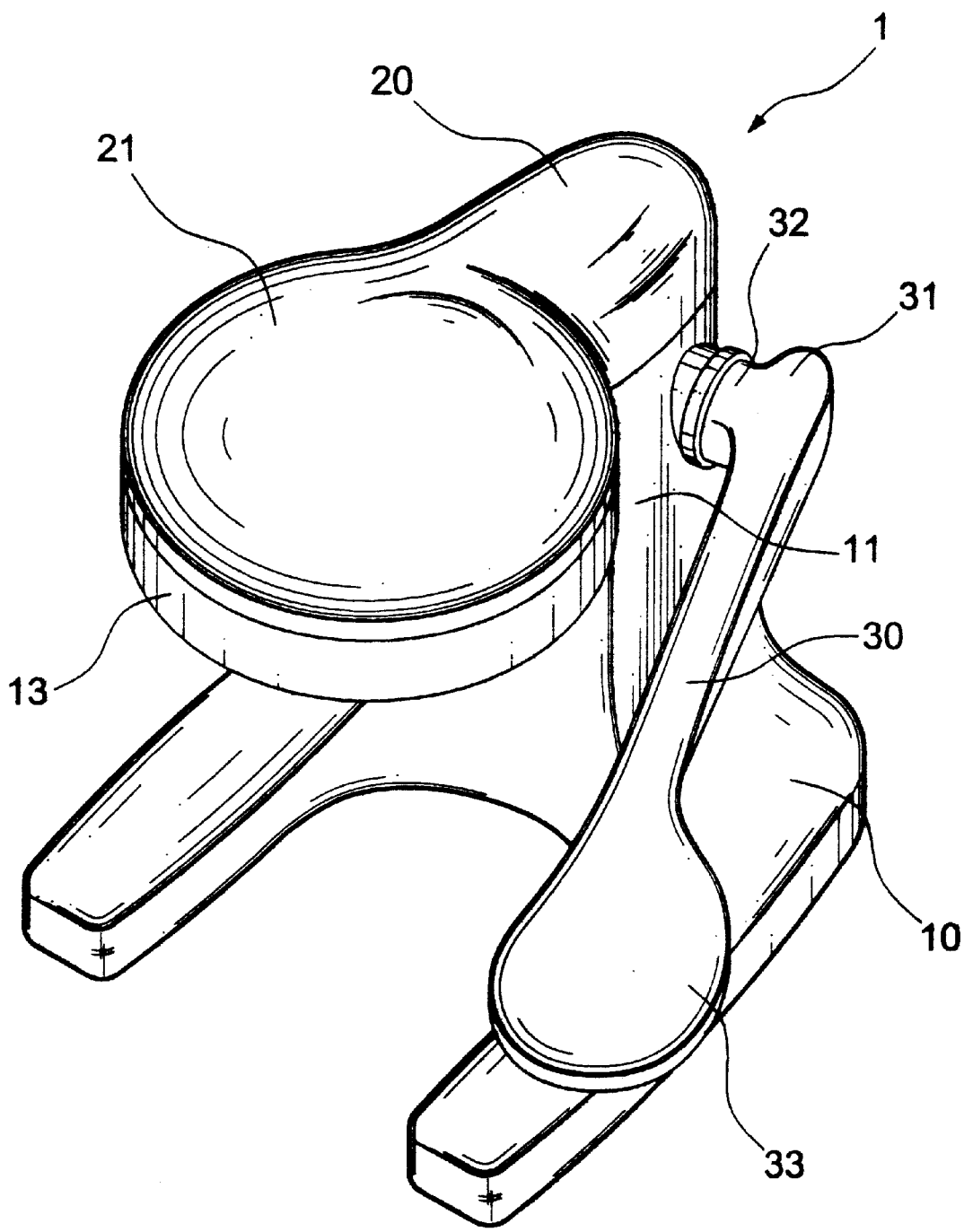
FIG. 1 is a perspective view of a juicer in accordance with the present invention.
Figure 2:
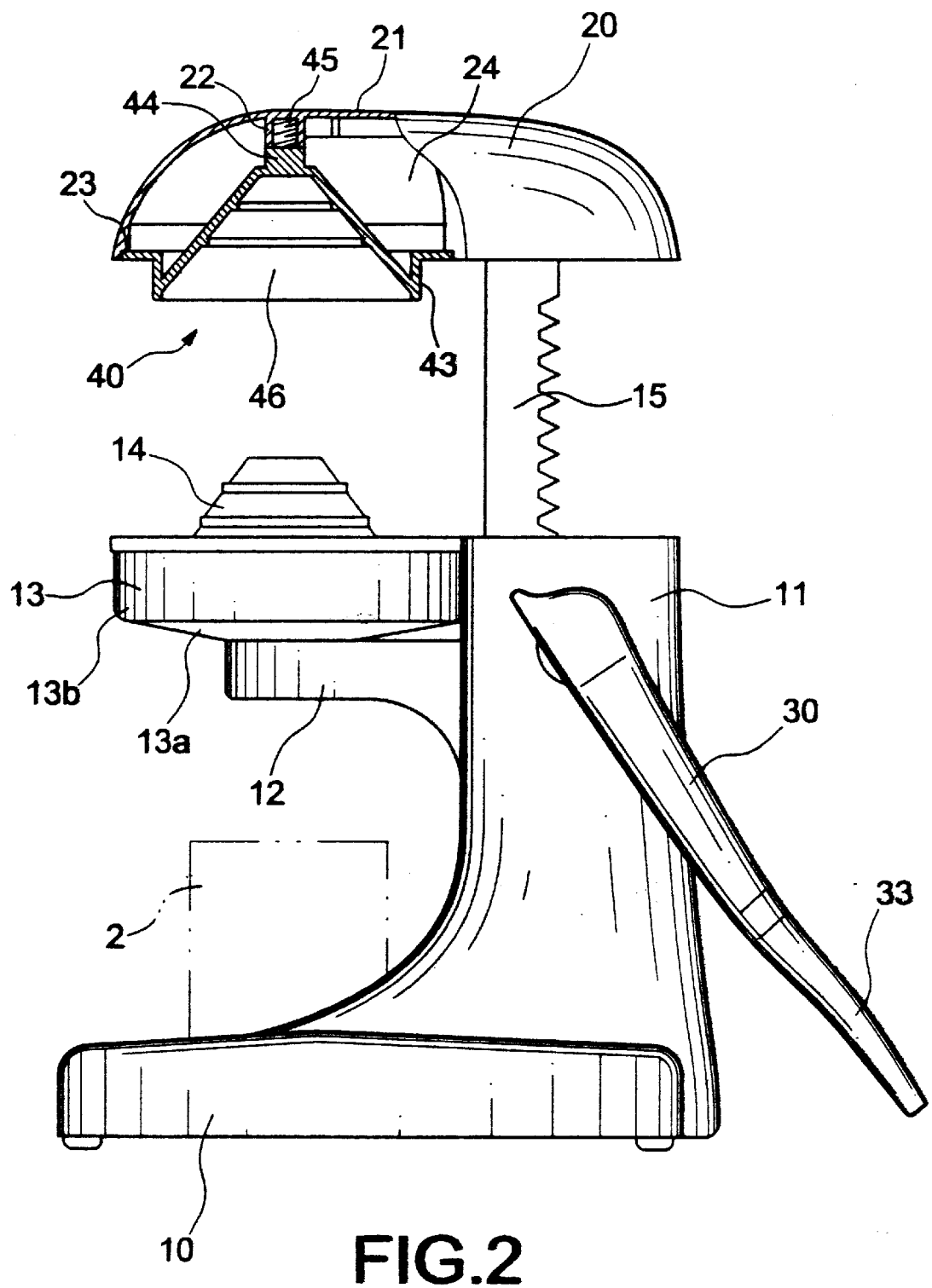
FIG. 2 is a side view of the juicer in accordance with the present invention.
Figure 4:
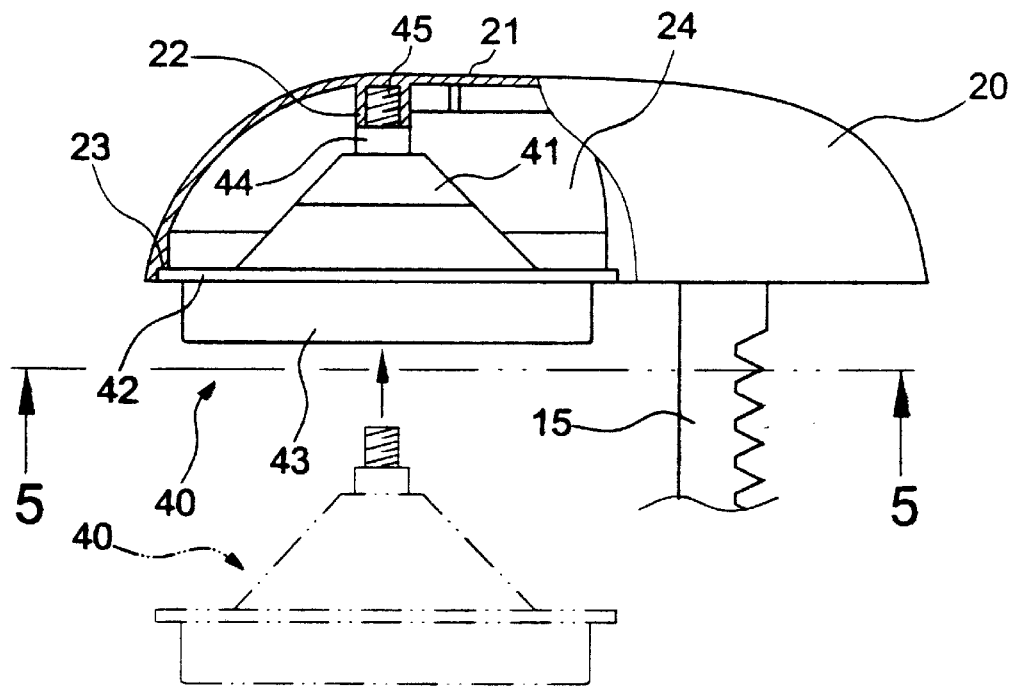
FIG. 4 is a side view, partly sectioned, of an upper portion of the juicer in accordance with the present invention.
Figure 5:
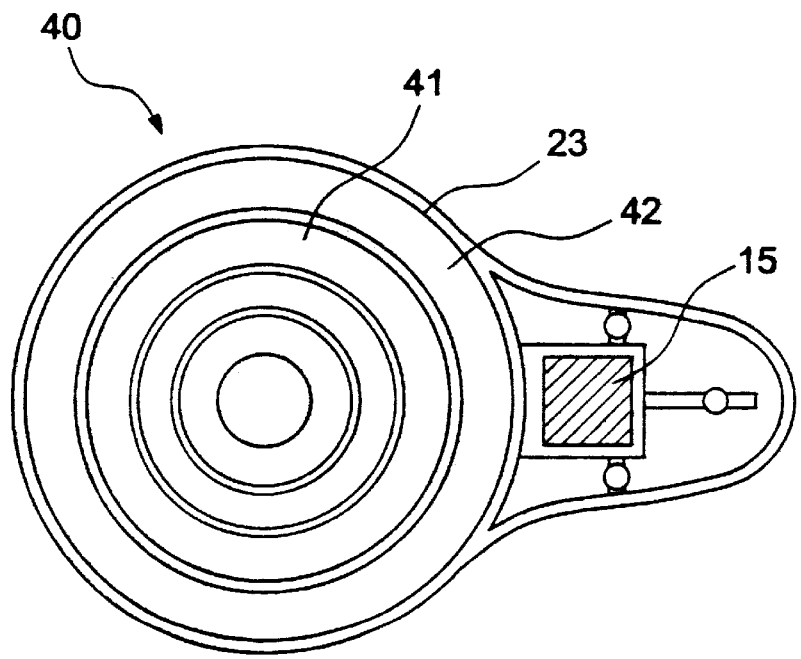
FIG. 5 is a sectional view taken along line 5—5 in FIG. 4.

Referring to FIGS. 1, 2, and 4, a juicer in accordance with the present invention is used to extract juice from citrus and comprises a base 10 for supporting a dripping cup 2. A column 11 extends upward from the base 10 and a support plate 12 projects from a side of the column 1 and extends in a horizontal plane. The support plate 12 includes a hole (not shown) located above the dripping cup 1. A handle 30 has an end 31 with a spindle 32 pivotally received in the column 11, best shown in FIG. 1. A gear (not sown) is mounted to the spindle 32 to rotate therewith. A vertical rod in the form of a rack 15 has a portion housed in the column and meshes with the gear. Thus, the vertical rack 15 is moved vertically when the handle 30 is pivoted. The other end of the handle 30 includes a flat portion 33 extending laterally therefrom. Thus, the user may apply force by his/her palm without difficulty.

Figure 3:
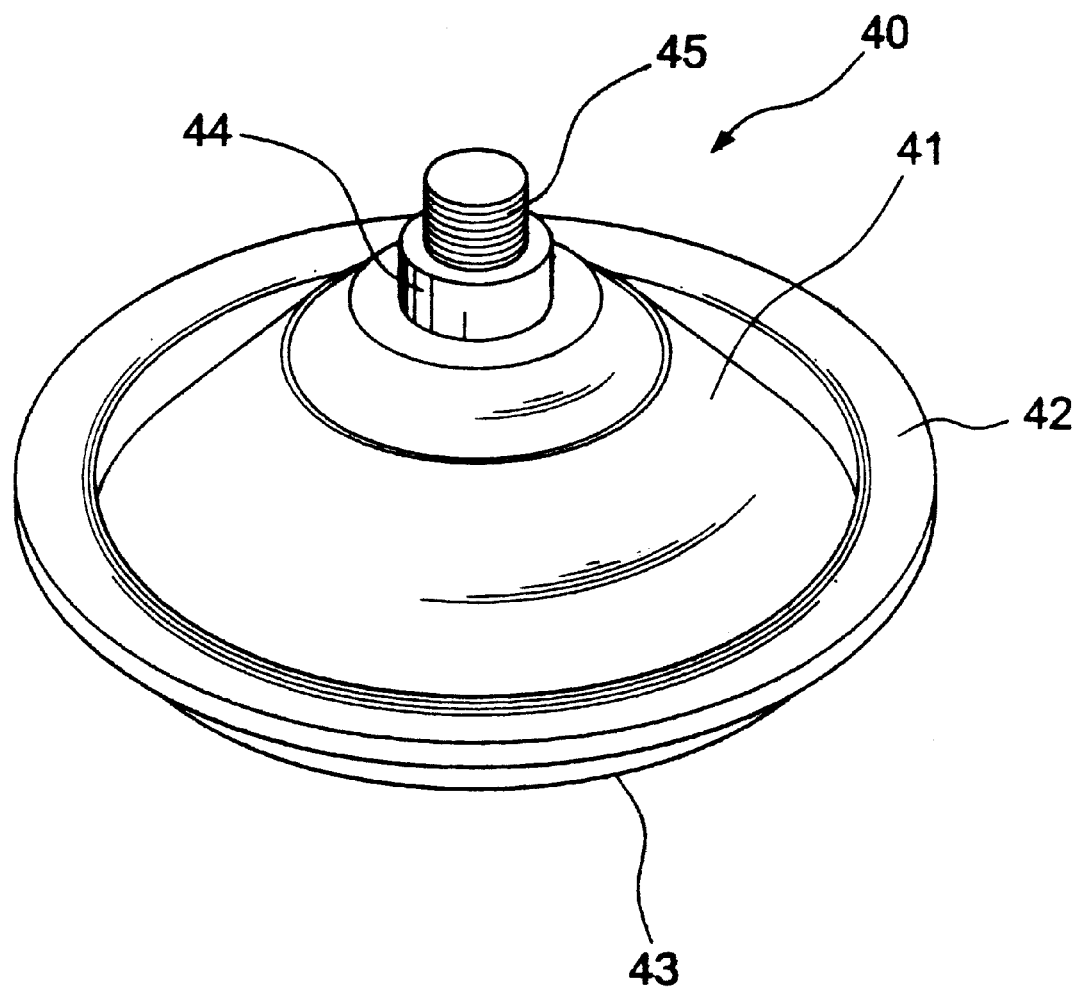
FIG. 3 is a top perspective view of a pressure cup of the juicer in accordance with the present invention.

A top seat 20 is securely attached to an upper end of the vertical rack 11 to move therewith. A pressing cup 40 includes a threaded upper end for threading engagement with the top seat 20. In this embodiment, as illustrated in FIGS. 1, 3 and 4, the top seat 20 includes a first portion to which the upper end of the column 11 is securely attached and a second enlarged portion 21. The second enlarged portion 21 including a compartment 24 for receiving an upper portion of the pressing cup 40. As illustrated in FIG. 3, the pressing cup 40 includes a disc 42, a conic portion 41 projecting from a side of the disc 42 and having a stud 45 formed on an apex 44 thereof, and a skirt 43 formed on the other side of the disc 42. The top seat 20 includes an engaging tube 22 with an inner threading for threading engagement with the stud 45. The user may grasp the skirt 43 to threadedly engage the stud 45 with the engaging tube 22 of the top seat 20. The top seat 20 further includes an annular recessed portion 23 for receiving an annular end edge of the disc 42, best shown in FIG. 4.

The support plate 12 supports a support member 13. In this embodiment, the support member 13 includes a conic portion 13a supported in the hole of the support plate 12 and a strainer wall 13b extending upward from a periphery of the conic portion 13a. A reamer 14 is placed inside the strainer wall 13b and supported by the conic portion 13a. A hole (not labeled) is defined in the conic portion 13a to guide extracted juice into the dripping cup 2.

In use, fruit with peel (i.e., citrus) is cut by half and a half of the fruit is placed on top of the reamer 14 and the handle 30 is then pivoted to move the vertical rack 15 downward. The pressure cup 40 is moved downward toward the fruit with peel and thus extracts juice from the fruit. The extracted juice flows into the drip cup 2. The skirt 43 has a conic inner periphery 46 for cooperating with the reamer to perform the juice-extracting function, which is conventional and therefore not described in detail.

During the juicing operation, the user's palm may be in intimate contact with the flat portion 33 on the handle 30, thereby preventing slip and the potential injury. In addition, the pressing force applied to the pressing cup 40 is uniformly distributed to the enlarged portion 21 due to provision of the annular recessed portion 23 of the top seat 20 that receives the annular end edge of the disc 42. Wear to the threaded portion 45 and loosening of the pressing cup 40 are avoided.

Although the invention has been explained in relation to its preferred embodiment, it is to be understood that many other possible modifications and variations can be made without departing from the scope of the invention as hereinafter claimed.

What is claimed is:

1. A juicer comprising:

a base;

a column extending upward from the base, a support plate extending from a side of the column;

a vertical rod having a portion movably mounted in the column and including an upper end, the vertical rod being movable along a vertical direction;

a top seat securely mounted to the upper end of the vertical rod to move therewith, the top seat including a compartment and an annular recessed portion surrounding the compartment;

a juicing device for extracting juice from citrus and comprising a pressing cup and a reamer, the reamer being removably mounted on the support plate, the pressing cup being mounted in the compartment of the top seat and including a disc having a first side releasably engaged with the top seat and a second side for cooperating with the reamer for extracting juice from a citrus placed on the reamer, the disc having an annular end edge that is received in the annular recessed portion of the top seat.

2. The juicer as claimed in claim 1, further comprising a handle having a first end operably connected to the vertical rod and a second end for manual operation, whereby the vertical rod moves vertically when the handle is pivoted.

3. The juicer as claimed in claim 2, wherein the second end of the handle comprises a flat portion extending laterally therefrom.

4. The juicer as claimed in claim 1, wherein the top seat comprises an engaging tube with an inner threading, the first side of the disc including a conic portion having a stub for threading engagement with the inner threading of the engaging tube.

5. The juicer as claimed in claim 4, wherein the second side of the disc comprises a skirt, the skirt including a conic inner periphery for cooperating with the reamer for extracting juice from a citrus placed on the reamer.

6. The juicer as claimed in claim 5, wherein the skirt comprises an outer periphery for user's grasp for proceeding with threading engagement between the stub and the engaging tube of the top seat.

* * * * *